(12) United States Patent
Lee

(10) Patent No.: US 8,526,290 B2
(45) Date of Patent: Sep. 3, 2013

(54) DATA COMPRESSION/DECOMPRESSION METHOD, DATA DECOMPRESSION METHOD, AND OPTICAL DISC DRIVE UTILIZING THE METHOD

(75) Inventor: Chin-Sung Lee, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 283 days.

(21) Appl. No.: 12/541,972

(22) Filed: Aug. 17, 2009

(65) Prior Publication Data
US 2011/0038245 A1 Feb. 17, 2011

(51) Int. Cl.
*G11B 20/00* (2006.01)

(52) U.S. Cl.
USPC .................................... 369/124.06

(58) Field of Classification Search
None
See application file for complete search history.

(56) References Cited

U.S. PATENT DOCUMENTS

| 6,411,227 | B1 | 6/2002 | Fish |
| 2005/0134932 | A1* | 6/2005 | Hashimoto et al. ...... 358/426.06 |
| 2007/0033322 | A1 | 2/2007 | Zimmer |
| 2007/0073941 | A1* | 3/2007 | Brink et al. .................... 710/68 |
| 2008/0100861 | A1* | 5/2008 | Sakura .......................... 358/1.15 |

FOREIGN PATENT DOCUMENTS

| EP | 1 901 292 A2 | 9/2007 |
| JP | 2000207193 | 7/2000 |
| TW | 200625281 | 7/2006 |

* cited by examiner

*Primary Examiner* — Joseph Haley
(74) *Attorney, Agent, or Firm* — Winston Hsu; Scott Margo

(57) ABSTRACT

A data compression/decompression method for operation of an optical disc drive is disclosed. The method comprises: obtaining data; and compressing at least one part of the data to generate compressed data, when the part of the data meets a predefined rule.

6 Claims, 4 Drawing Sheets

DATA COMPRESSION/DECOMPRESSION METHOD, DATA DECOMPRESSION METHOD, AND OPTICAL DISC DRIVE UTILIZING THE METHOD

BACKGROUND

The present application is related with data compression/decompression method, data decompression method and optical disc drive utilizing the methods.

In an optical disc drive, a storage unit such as a non-volatile memory may be provided to store instruction code and/or data that would be executed or read to start or facilitate operation of the optical disc drive. As shown in FIG. 1, instruction code and/or data could be stored to a storage unit 103, and then the instruction code and/or data is read and processed by the micro processor unit 105. However, the storage unit may be a high cost device and the manufacturing cost of the optical disc drive increases accordingly. Therefore, it is improper to directly store whole instruction code and/or data to the storage unit 103 without compressing the instruction code and/or data, since a large amount of storage space will be needed by this way.

SUMMARY OF THE INVENTION

One embodiment of the present application discloses a data compression/decompression method for operation of an optical disc drive. The method comprises: obtaining data; and compressing at least one part of the data to generate compressed data, when the part of the data meets a predefined rule.

Another embodiment of the present application discloses a data decompression method for operation of an optical disc drive. The method comprises: obtaining compressed data; and decompressing at least one part of the compressed data to generate de-compressed data, when the part of the compressed data meets a predefined rule.

Another embodiment of the present application discloses an optical disc drive. The optical disc drive comprises: a first storage unit, for storing compressed data; and a de-compressing means, for decompressing at least one part of the compressed data to generate de-compressed data, when the part of the compressed data meets a first predefined rule.

According to above-mentioned embodiments, the data can be compressed according to different requirements, thus the problem disclosed in related art can be avoided.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, when one device is coupled to another device, that connection may be through a direct electrical connection, or through an indirect electrical connection via other devices and connections.

Figure 1:
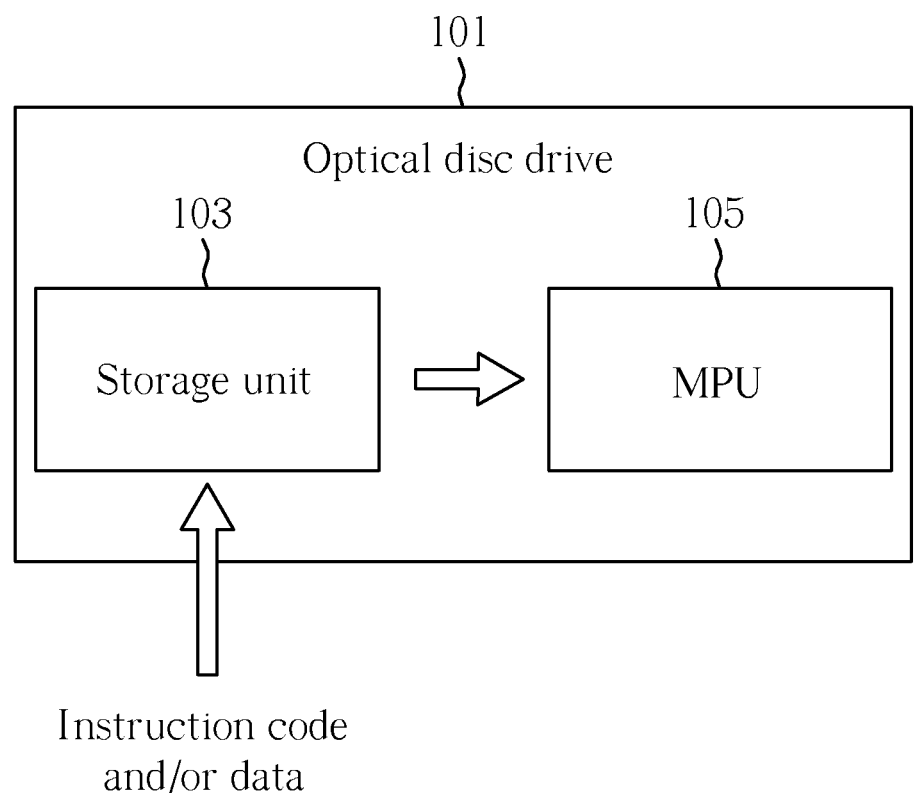
FIG. 1 is a block diagram illustrating a related art optical disc drive.
Figure 2:
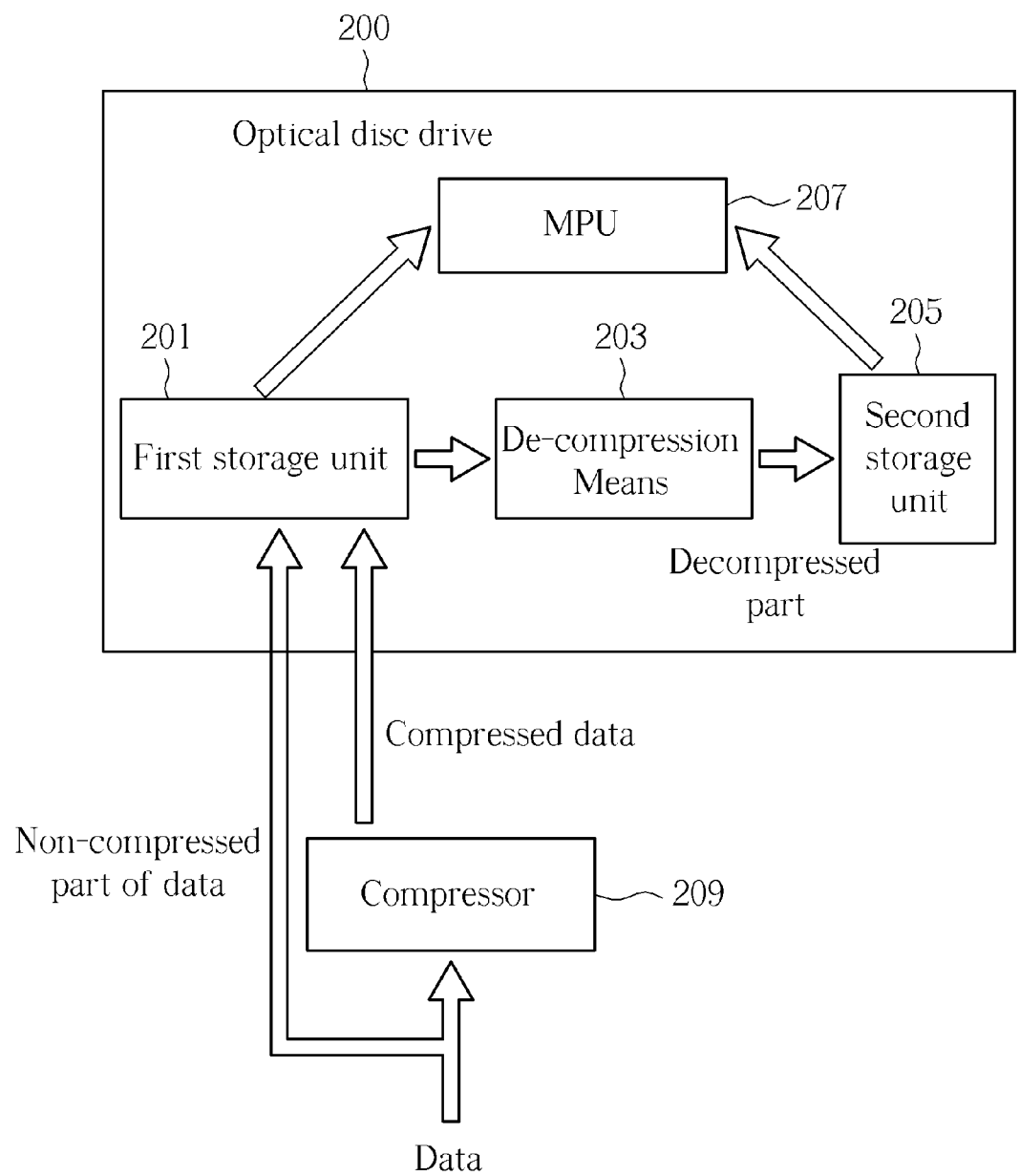
FIG. 2 is a block diagram illustrating an optical disc drive according to a first embodiment of the present application.

FIG. 2 is a block diagram illustrating an optical disc drive 200 according to a first embodiment of the present application. As shown in FIG. 2, the optical disc drive 200 comprises a first storage unit 201, a de-compression means 203, a second storage unit 205 and a micro processor unit 207. The first storage unit 201 is utilized for storing compressed data and/or non-compressed data. The compressed data is compressed by a compressor 209, which can be provided inside or outside the optical disc drive 200. Also, the data can include, but not limited to, instruction code for the optical disc drive 200 and/or raw data. The instruction code and/or raw data could be executed or read to start or facilitate operation of the optical disc drive 200. The instruction code can be data bytes fetched and executed by the micro processor unit 207 to operate part or whole system. The raw data can be data bytes only fetched by the micro processor unit 207. Also, please note that the term "data" can indicate other information, including or not including instruction code and/or raw data. The de-compression means 203 is utilized for obtaining at least one part of the compressed data from the first storage unit 201 and/or for decompressing at least one part of the compressed data to generate de-compressed data, when the part of the compressed data meets a first predefined rule. The data can be compressed according to a second predefined rule, randomly compressed, or fully compressed by the compressor 209 to generate the compressed data. The compression operation of the compressor 209 will be explained for more detail as below. It should be noted that the de-compression means 203 can be implemented by hardware, by firmware or by software such as circuit or subroutine in the micro processor unit 207. The first storage unit 201 and the second storage unit 205 may be or not be the same storage device, or may be or not be the same part of a storage device. The first storage unit 201 may be, but not limited to, a non-volatile memory such as a Flash, EPRROM, or EEPROM. The second storage unit may be, but not limited to, a volatile memory such as a DRAM or SRAM.

In this embodiment, the first predefined rule may comprise: the part of the compressed data is needed for the following operations of the optical disc drive. For example, when the following operation of the optical disc drive 200 needs some specific codes, which are already compressed and stored in the first storage unit 201, the de-compression means 203 will de-compress the compressed instruction code. The de-compressed data may be stored to the second storage unit 205. Other part of the compressed data that is not de-compressed may be hold in the first storage unit 201 or sent to the micro processor unit 207, depending on design requirements. Additionally, the part of the compressed data can be determined whether it is needed for the following operations of the optical disc drive or not according to following conditions: whether the part of the compressed data is related with a format of an optical disc that the optical disc drive is processing or not, whether the part of the compressed data is from at least one of particular address or not, and whether the part of the compressed data is related with a specific operation of the optical disc drive or not. The addresses described here can include, but not limited to, the storage address of the data before compression and/or the storage address of the compressed data. The specific operation can include at least one of: a writing operation, a reading operation, a testing operation and an information gathering operation. The non-decompressed part of compressed data may be hold in the first storage unit 201 or sent to the micro processor unit 207, depending on design requirements.

The micro processor unit 207 may be utilized for reading the de-compressed data from the second storage unit 205 and/or non-compressed part of the data from the first storage unit 201, according to which one is needed for the following operations of the optical disc drive 200. For example, the micro processor unit 207 will be informed the addresses of the de-compressed data and the non-compressed part of the data. Therefore, the micro processor unit 207 will read desired data from the first storage unit 201 when the address indicates that the desired data is stored in the first storage unit 201. Similarly, the micro processor unit 207 will read desired data from the second storage unit 205 when the address indicates that the desired data is stored in the second storage unit 205.

The compressor 209 can compress at least one part of data to generate the compressed data, when the part of the data meets the second predefined rule. In this embodiment, the second predefined rule can be: the part of the data is related with a format of an optical disc that the optical disc drive 200 processes. The formats of an optical disc may include CD, DVD, BD, etc. For example, the data related with the CD format could be compressed as a set, the data related with the DVD+ format could be compressed as a set, the data related with the DVD– format could be compressed as a set, and so on. The term "related with" a certain format may mean, but not limited to, that the data would be needed when the optical disc drive 200 is processing or going to process a disc of the certain format. Then the set of compressed data related with the certain format may be de-compressed when the optical disc drive is processing or going to process a disc of the certain format. In another embodiment, when the optical disc inside the optical disc drive 200 is of a certain format, then the instruction codes of other formats may be compressed and stored in the first storage unit 201.

Additionally, the second predefined rule can be: the part of the data is from at least one of particular addresses. The addresses described here can include, but not limited to, the storage address of the data, such as instruction code and/or raw data, before compression. Besides, the second predefined rule can include: the part of the data is related with a specific operation of the optical disc drive. The term "related with" a specific operation may mean, but not limited to, that the data would be needed when the optical disc drive 200 is performing or going to perform the specific operation. For example, the data related with the reading operation could be compressed as a set, the data related with the writing operation could be compressed as a set, the data related to the testing operation could be compressed as a set, and so on. Then the set of compressed data related with the specific operation may be de-compressed when the optical disc drive is performing or going to perform the specific operation. For example, when the part of data is for testing function (or other functions such as writing, reading, etc), it may be compressed and stored in the first storage unit 201.

Alternatively, the second predefined rule can be: the part of the data is not utilized in the following operations of the optical disc drive 200. For example, the following operation of the optical disc drive 200 may be a reading function, and the data having no relation with the reading function may be compressed and stored in the first storage unit 201. The optical disc drive 200 can further include a determining means (not illustrated) to determine which part of data should be compressed and which part of data should be decompressed. Such determining unit can be implemented by hardware such as a circuit, by firmware, or by software such as subroutine in the micro processor unit 207.

Additionally, the compressor 209 can compress at least one part of data randomly to generate the compressed data instead of compressing according to whether the data meets a predefined rule or not. In this case, the micro processor unit 207 can determine or be informed which part of the data was compressed and where the compressed data is stored. Thus the compressed data can be read and de-compressed accordingly. In another embodiment, the compressor 209 can be included in the optical disc drive 200.

Figure 3:
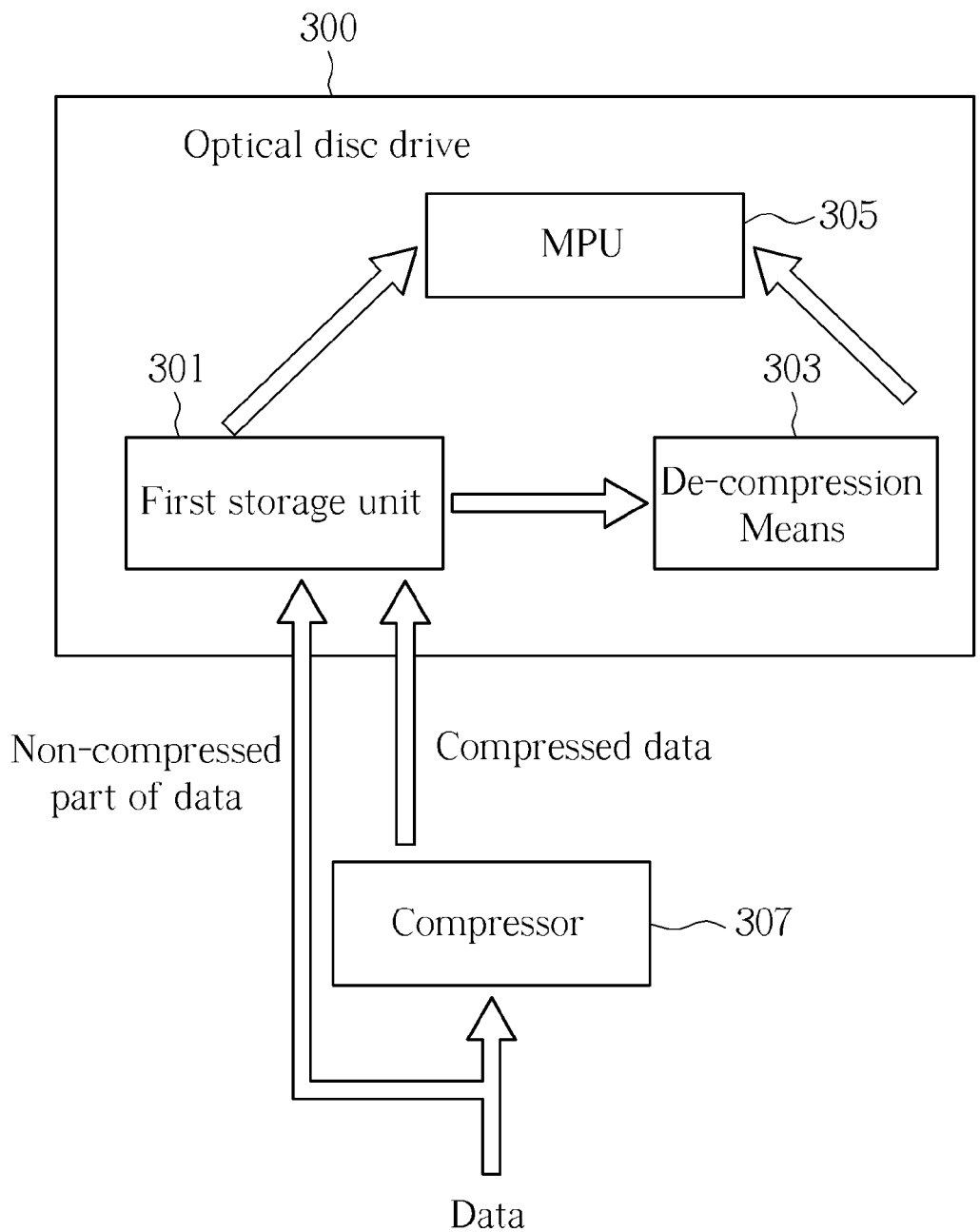
FIG. 3 is a block diagram illustrating an optical disc drive according to a second embodiment of the present application.

FIG. 3 is a block diagram illustrating an optical disc drive 300 according to a second embodiment of the present application. Comparing with the optical disc drive 200, the second storage unit 205 is removed thus the optical disc drive 300 comprises only a first storage unit 301, a decompressing means 303, and a micro processor unit 305. In this embodiment, the decompressed data is not buffered but directly transmitted to the micro processor unit 305. Therefore, the operation of the optical disc drive 300 can be summarized as follows: At least one part of the data is compressed by the compressor 307, which can be provided inside or outside the optical disc drive 300. The micro processor unit 305 obtains the de-compressed data from the decompressing means 303 and/or reads non-compressed part of the data from the first storage unit 301, according to which one is needed for the following operations of the optical disc drive. The non-decompressed part of compressed data may be hold in the first storage unit 301 or sent to the micro processor unit 305, depending on design requirements. In another embodiment, the compressor 307 can be included in the optical disc drive 300. The compression and decompression operations can follow predefined rules, as above-mentioned description. Other detail characteristics are already described in the embodiment shown in FIG. 2, thus it is omitted for brevity here. It should be noted that the above-mentioned structures are only for example and do not mean to limit the scope of the present application.

Figure 4:
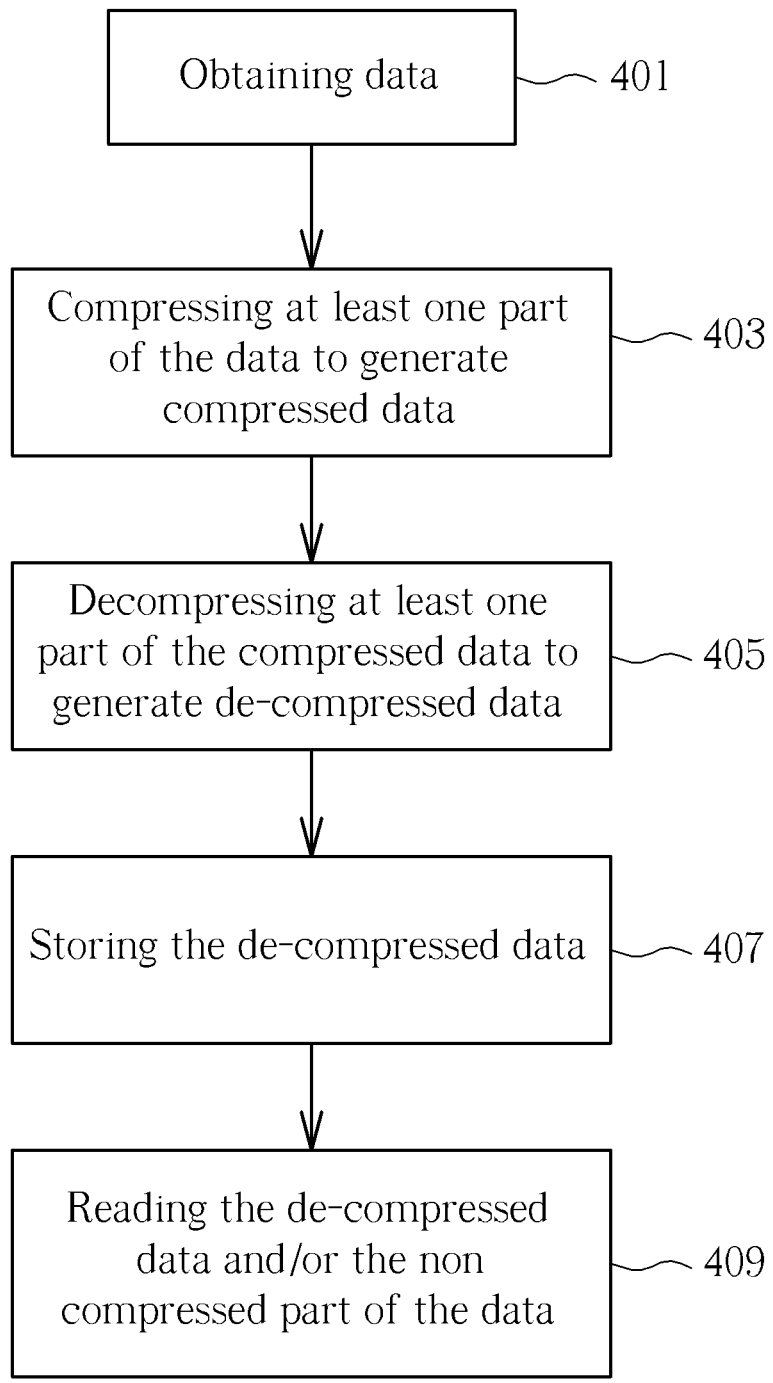
FIG. 4 is a flow chart illustrating a data compression/decompression method according to one embodiment of the present application.

FIG. 4 is a flow chart illustrating a data compression/decompression method according to one embodiment of the present application. As shown in FIG. 4, the method comprises:

Step 401

Obtain data.

Step 403

Compress at least one part of the data to generate compressed data, when the part of the data meets a predefined rule.

Step 405

Decompress at least one part of the compressed data to generate de-compressed data, when the part of the compressed data meets a predefined rule.

Step 407

Store the de-compressed data. This step corresponds to the embodiment shown in FIG. 2. When this method is applied to the embodiment shown in FIG. 3, this step is omitted.

Step 409

Read one of the de-compressed data and/or the non-compressed part of the data for following processes.

The above-mentioned steps 401 and 403 can be regarded as a data compressing method according to an embodiment of the present application. Additionally, the step 405 can be regarded as a data de-compressing method according to an embodiment of the present application. The compression and decompression operations can follow predefined rules, as above-mentioned description. Other detail characteristics are already described in the embodiment shown in FIG. 2, thus it is omitted for brevity here.

According to above-mentioned embodiments, the data can be compressed according to different requirements, thus the problem disclosed in related art can be avoided.

Those skilled in the art will readily observe that numerous modifications and alterations of the device and method may be made while retaining the teachings of the invention.

What is claimed is:

1. An optical disc drive, comprising:
   a first storage unit, for storing compressed data; and
   a de-compressing means, for decompressing at least one part of the compressed data to generate de-compressed data, when the part of the compressed data meets a first predefined rule;
   a second storage unit, for storing the de-compressed data;
   a micro processor unit, for reading the de-compressed data from the second storage unit when the de-compressed data is needed for the following operations of the optical disc drive; and
   a compressor, for compressing at least one part of data randomly to generate the compressed data;
   wherein the micro processor unit determines or is informed which part of the data was compressed and where the compressed data is stored so that the compressed data can be read and de-compressed accordingly.

2. The optical disc drive of claim 1, wherein the first predefined rule comprises: the part of the compressed data is needed for the following operations of the optical disc drive.

3. The optical disc drive of claim 1, wherein the compressed data comprises instruction code.

4. A data compression/decompression method for operation of an optical disc drive, comprising:
   compressing at least one part of data randomly to generate the compressed data;
   storing compressed data;
   decompressing at least one part of the compressed data to generate de-compressed data, when the part of the compressed data meets a first predefined rule;
   utilizing a storage unit to store the de-compressed data;
   utilizing a micro processor to read the de-compressed data from the storage unit when the de-compressed data is needed for the following operations of the optical disc drive; and
   wherein the micro processor unit determines or is informed which part of the data was compressed and where the compressed data is stored so that the compressed data can be read and de-compressed accordingly.

5. An optical disc drive, comprising:
   a compressor, for compressing at least one part of data randomly to generate compressed data;
   a storage unit, for storing the compressed data; and
   a micro processor unit, for controlling a reading operation for reading at least part of the compressed data from the storage unit;
   wherein the micro processor unit determines or is informed which part of the data was compressed and where the compressed data is stored.

6. A data compression method for operation of an optical disc drive, comprising:
   compressing at least one part of data randomly to generate compressed data;
   storing the compressed data; and
   utilizing a micro processor unit to control a reading operation for reading at least part of the compressed data from the storage unit;
   wherein the micro processor unit determines or is informed which part of the data was compressed and where the compressed data is stored.

* * * * *